US012665501B2

(12) United States Patent
Chiba

(10) Patent No.: US 12,665,501 B2
(45) Date of Patent: Jun. 23, 2026

(54) SWITCHING POWER SUPPLY DEVICE

(71) Applicant: GS Yuasa International Ltd., Kyoto (JP)

(72) Inventor: Akiteru Chiba, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 156 days.

(21) Appl. No.: 18/845,239

(22) PCT Filed: Feb. 7, 2023

(86) PCT No.: PCT/JP2023/003959
§ 371 (c)(1),
(2) Date: Sep. 9, 2024

(87) PCT Pub. No.: WO2023/171202
PCT Pub. Date: Sep. 14, 2023

(65) Prior Publication Data
US 2025/0202375 A1      Jun. 19, 2025

(30) Foreign Application Priority Data

Mar. 10, 2022 (JP) ................................ 2022-037368
May 13, 2022 (JP) ................................ 2022-079372

(51) Int. Cl.
H02M 3/335          (2006.01)
H02M 3/00          (2006.01)

(52) U.S. Cl.
CPC ......... H02M 3/01 (2021.05); H02M 3/33571 (2021.05); H02M 3/33592 (2013.01)

(58) Field of Classification Search
CPC .. H02M 3/33592; H02M 1/0067; H02M 3/01; H02M 3/33571; H02M 1/0043;
(Continued)

(56) References Cited

U.S. PATENT DOCUMENTS 6,297,976 B1 * 10/2001 Isono ................ H02M 3/33553
                                                                363/71
10,256,739 B2 * 4/2019 Hao ........................ H02M 3/01
(Continued)

FOREIGN PATENT DOCUMENTS

JP          2007-006669 A     1/2007
JP               6696617 B1     5/2020
(Continued)

OTHER PUBLICATIONS

International Search Report and Written Opinion for Patent Cooperation Treaty Application No. PCT/JP2023/003959, dated Mar. 7, 2023, 8 pages.

*Primary Examiner* — Yusef A Ahmed
(74) *Attorney, Agent, or Firm* — Buchalter LLP

(57)          ABSTRACT

In a circuit element 10a, resonant circuits are arranged in parallel. A resonant capacitor $Crk_q$ of a q-th resonant circuit arranged in parallel has one end connected in series to a resonance reactor $Lr_q$ and a primary winding $N1_q$ of a transformer $Tr_q$. The resonant capacitor $Crk_q$ of the q-th resonance circuit arranged in parallel has another end connected to the resonant capacitor $Crk_q$ of a q-th one of the resonance circuit arranged in parallel in another one of the circuit elements 10a so that a k-dimensional multiphase LLC converter having a phase difference of 360°/Pk is constructed by Pk circuit elements.

12 Claims, 10 Drawing Sheets

(58) Field of Classification Search
CPC ............. H02M 1/0058; H02M 1/0064; H02M 1/0095; Y02B 70/10
See application file for complete search history.

(56) References Cited

U.S. PATENT DOCUMENTS

| | | | | |
|---|---|---|---|---|
| 10,658,937 | B1 * | 5/2020 | Zafarana | H02M 1/083 |
| 12,119,750 | B2 * | 10/2024 | Drofenik | H02M 3/01 |
| 12,149,178 | B2 * | 11/2024 | Drofenik | H02M 7/4815 |
| 2006/0291260 | A1 | 12/2006 | Nakashima | |
| 2008/0190906 | A1 * | 8/2008 | Aigner | H02M 3/335 |
| | | | | 219/130.21 |
| 2008/0298093 | A1 * | 12/2008 | Jin | H02M 3/285 |
| | | | | 363/126 |
| 2010/0328968 | A1 * | 12/2010 | Adragna | H02M 3/01 |
| | | | | 363/21.02 |
| 2011/0069514 | A1 * | 3/2011 | Chiba | H02M 3/01 |
| | | | | 363/21.02 |
| 2012/0262953 | A1 * | 10/2012 | Jungreis | H02M 3/33571 |
| | | | | 363/21.02 |
| 2012/0275197 | A1 * | 11/2012 | Yan | H02M 3/33592 |
| | | | | 363/21.02 |
| 2012/0307529 | A1 * | 12/2012 | Chiba | H02M 1/08 |
| | | | | 363/17 |
| 2014/0111016 | A1 * | 4/2014 | He | H02M 7/487 |
| | | | | 307/82 |
| 2014/0268891 | A1 * | 9/2014 | Sigamani | H02M 1/14 |
| | | | | 363/17 |
| 2016/0072388 | A1 * | 3/2016 | Dubus | H02M 3/3376 |
| | | | | 363/25 |
| 2016/0254756 | A1 * | 9/2016 | Yang | H01F 27/2823 |
| | | | | 363/21.02 |
| 2017/0025963 | A1 * | 1/2017 | Otake | H02M 3/33571 |
| 2018/0006568 | A1 * | 1/2018 | Adragna | H02M 3/01 |
| 2018/0191168 | A1 * | 7/2018 | Banaska | H02M 3/01 |
| 2018/0342958 | A1 * | 11/2018 | Ji | H02M 3/33571 |
| 2019/0109543 | A1 * | 4/2019 | Adragna | H02M 3/01 |
| 2019/0355506 | A1 * | 11/2019 | Fei | H01F 27/2804 |
| 2019/0379291 | A1 * | 12/2019 | Xue | H02M 7/219 |
| 2019/0379292 | A1 * | 12/2019 | Fei | H01F 3/14 |
| 2020/0014306 | A1 * | 1/2020 | Riar | H02M 3/33584 |
| 2020/0350826 | A1 * | 11/2020 | Adragna | H02M 3/01 |
| 2021/0083590 | A1 * | 3/2021 | Lu | H01F 38/08 |
| 2021/0408927 | A1 * | 12/2021 | Zhang | H02M 3/33592 |
| 2022/0103083 | A1 * | 3/2022 | Zhou | H02M 1/348 |
| 2023/0009358 | A1 * | 1/2023 | Li | H02M 3/33573 |
| 2023/0223856 | A1 * | 7/2023 | Sato | H02M 1/081 |
| | | | | 363/21.02 |
| 2025/0047210 | A1 * | 2/2025 | Chiba | H02M 3/33571 |
| 2025/0317066 | A1 * | 10/2025 | Takagi | H02M 1/0064 |
| 2025/0373168 | A1 * | 12/2025 | Chiba | H02M 3/01 |

FOREIGN PATENT DOCUMENTS

| | | |
|---|---|---|
| JP | 2021-035200 A | 3/2021 |
| JP | 2021-153382 A | 9/2021 |

* cited by examiner (a)

(b)

(a)

One of connection points in
four-dimensional direction

1

2

3

(b)

1        2        3

1

2

3

One of connection points in
five-dimensional direction (c)

3

2

1

1

One of connection points in
six-dimensional direction

1

2

3

SWITCHING POWER SUPPLY DEVICE

CROSS REFERENCE TO RELATED APPLICATIONS

This application is a National Stage Application, filed under 35 U.S.C. § 371, of International Application No. PCT/JP2023/003959, filed Feb. 7, 2023, which international application claims priority to and the benefit of Japanese Application No. 2022-037368, filed Mar. 10, 2022, and Japanese Application No. 2022-079372, filed May 13, 2022; the contents of all of which are hereby incorporated by reference in their entirety.

BACKGROUND

Technical Field

The present invention relates to a switching power supply device that converts input voltage into output voltage by using a plurality of LLC converters connected in parallel.

Description of Related Art

In recent years, in order to realize large current and a low ripple with increase in an output load, there is known a multiphase switching power supply device in which the number of operation phases (the number of phases) is more than one and phases are shifted to drive each operation phase (see, for example, JP 6696617 B2).

BRIEF SUMMARY

However, as the number of phases increases, the number of complementary gate drive signals of a complementary switch to be prepared also increases. Therefore, control associated with increase in the number of phases becomes also complicated, and a circuit related to control becomes large in scale and so on. Accordingly, power expansion by multiple phases has not been able to be easily performed.

One aspect of the present invention provides a switching power supply device in which high power can be achieved by parallel arrangement of resonant circuits without increasing the number of complementary gate drive signals.

A switching power supply device according to one aspect of the present invention includes, as a circuit element, a plurality of half-bridge LLC converters in which resonant circuits are arranged in parallel. The circuit element includes a first switch element and a second switch element connected in series to both ends of a DC power supply, and m (m is a natural number of two or more) resonant circuits arranged in parallel, each of which including a resonant reactor having one end connected to a connection point between the first switch element and the second switch element, a primary winding of a transformer, and n (n is a natural number of two or more) of a first order resonant capacitor to an n-th order resonant capacitor. A k-th resonant capacitor (k is a natural number of one to n) of a q-th (q is a natural number of one to m) one of the resonant circuits arranged in parallel has one end connected to the resonant reactor and a primary winding of the transformer, and another end connected to the k-th order resonant capacitor of a q-th one of the resonant circuits arranged in parallel in another circuit element so that a k-dimensional multiphase LLC converter having a phase difference of 360°/Pk is constructed by Pk (Pk is any natural number) circuit elements.

Further, a switching power supply device according to one aspect of the present invention includes, as a circuit element, a plurality of half-bridge LLC converters in which resonant circuits (circuit portions excluding the resonance reactor) are arranged in parallel. The circuit element includes a first switch element and a second switch element connected in series to both ends of a DC power supply, a resonant reactor having one end connected to a connection point between the first switch element and the second switch element, and m (m is a natural number of two or more) resonant circuits arranged in parallel, each of which including a primary winding of a transformer, and n (n is a natural number of two or more) of a first order resonant capacitor to an n-th order resonant capacitor, connected to another end of the resonant reactor. A k-th resonant capacitor (k is a natural number of one to n) of a q-th (q is a natural number of one to m) one of the resonant circuits arranged in parallel has one end connected to the resonant reactor and a primary winding of the transformer, and another end connected to the k-th order resonant capacitor of a q-th one of the resonant circuits arranged in parallel in another circuit element so that a k-dimensional multiphase LLC converter having a phase difference of 360°/Pk is constructed by Pk (Pk is any natural number) circuit elements.

According to one aspect of the present invention, the number of complementary gate drive signals can be made smaller than the total number of circuit elements, and high power can be realized by parallel arrangement of resonant circuits without increasing the complementary gate drive signal.

DETAILED DESCRIPTION OF VARIOUS EMBODIMENTS

Figure 1:
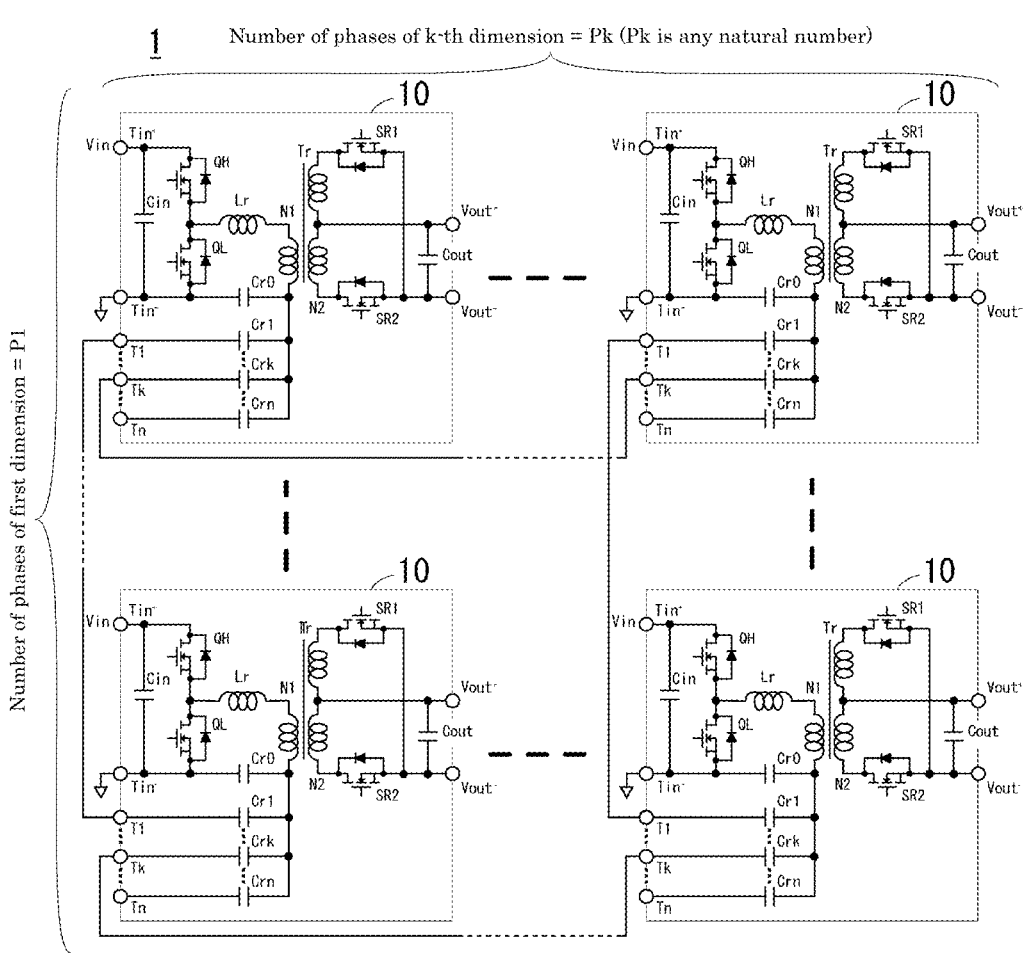
FIG. 1 is a diagram illustrating a circuit configuration of an embodiment of a switching power supply device.

Hereinafter, an embodiment of the present invention will be described in detail with reference to the drawings. In an embodiment below, the identical reference numeral is given to configurations indicating the same functions, and description of such configurations is appropriately omitted.

Referring to FIG. 1, a switching power supply device 1 according to the present embodiment includes a plurality of (Σ) half-bridge LLC converters (hereinafter, referred to as circuit elements 10). In the switching power supply device 1, each of one to n dimensions is configured as a multiphase LLC converter. That is, the switching power supply device 1 is a multiphase multi-LLC converter. Here, n is a natural number of two or more, and the switching power supply device 1 including a multiphase LLC converter of two or more dimensions will be described below.

The circuit element 10 includes a first switch element QH and a second switch element QL connected in series between a high potential input terminal Tin$^+$ connected to a positive electrode of a DC power supply Vin and a low potential input terminal Tin$^-$ connected to a negative electrode of the DC power supply Vin.

The circuit element 10 includes a resonant circuit including a resonant reactor Lr having one end connected to a connection point between the first switch element QH and the second switch element QL, a primary winding N1 of a transformer Tr, and n+1 resonant capacitors Cr0 to CM.

The circuit element 10 includes a rectifier smoothing circuit including synchronous rectifying elements SR1 and SR2 that rectify and smooth voltage of a secondary winding N2 of the transformer Tr and an output capacitor Cout.

In FIG. 1, only a main circuit of the circuit element 10 is illustrated in a solid line frame (corresponding to a module). For the rectifier smoothing circuit, a rectifying system such as center tap rectification, bridge rectification, voltage doubler rectification, and Cockcroft-Walton rectification can be employed.

An input capacitor Cin is connected between the high potential input terminal Tin$^+$ and the low potential input terminal Tin$^-$, and both ends of the output capacitor Cout are connected to a high potential output terminal Vout$^+$ and a low potential output terminal Vout-.

The resonant capacitor Cr0 has one end connected in series to the resonant reactor Lr and the primary winding N1 of the transformer Tr, and another end connected to the low potential input terminal Tin$^-$.

The resonant capacitors Cr1 to Cm have one ends which are all connected in series to the resonant reactor Lr and the primary winding N1 of the transformer Tr, and another ends respectively connected to the bypass terminals T1 to Tn. Another end (bypass terminal Tk) of a k-th (k is a natural number of one to n) resonant capacitor Crk is connected to another end (bypass terminal Tk) of the k-th resonant capacitor Crk of another one of the circuit elements 10 so that a k-dimensional multiphase LLC converter having a phase difference of 360°/Pk is constructed by Pk (Pk is any natural number) of the circuit elements 10. In the present description, each of n interconnection points of the bypass terminals T1 to Tn is referred to as a k dimension regardless of orthogonality of dimensions.

The total number Σ of the circuit elements 10 is expressed by Formula (1) below by using Pk, which is the number of phases in each of k dimensions.

[Mathematical formula 1]

$$\sum = \prod_{k=1}^{n} Pk \qquad (1)$$

Figure 2:
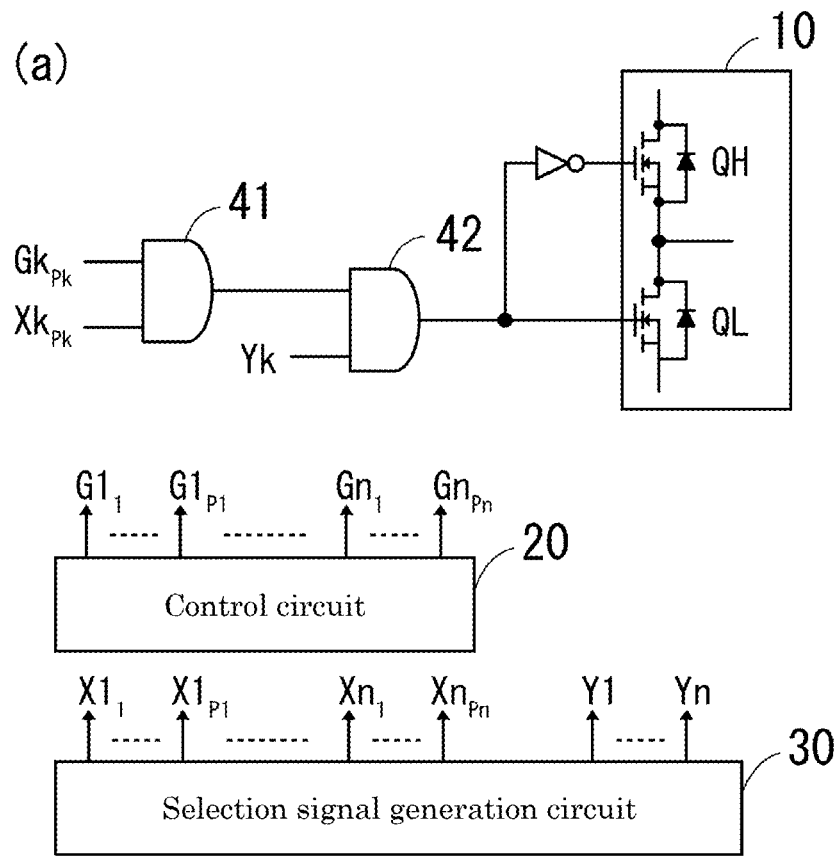
FIG. 2 is a diagram for explaining a circuit for controlling operation of the switching power supply device illustrated in FIG. 1.
Figure 2:
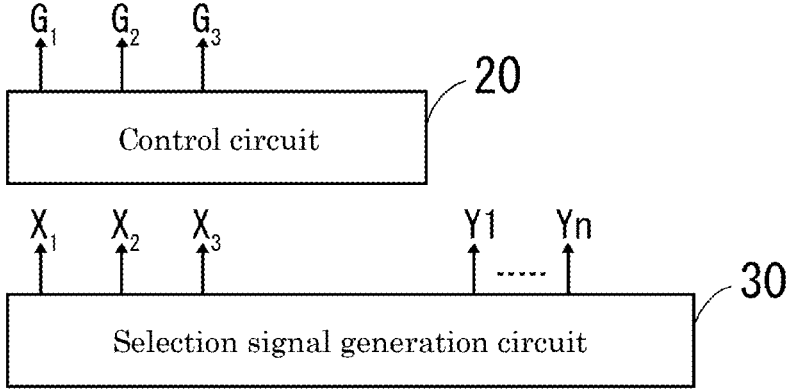

Referring to FIG. 2(a), the switching power supply device 1 includes a control circuit 20 and a selection signal generation circuit 30. The control circuit 20 alternately turns on and off the first switch element QH and the second switch element QL of the Σ circuit elements 10 by a complementary gate drive signal Gk$_{Pk(k=1\ to\ n)}$. The selection signal generation circuit 30 controls a dimension selection circuit 42 by a dimension selection signal Yk to select operation and stop of the circuit element 10 for each dimension, and controls a phase selection circuit 41 by the phase selection signal Xk$_{Pk(k=1\ to\ n)}$ to select operation and stop of the Σ circuit elements 10 for each dimension and phase.

The numbers of phases P1 to Pn in one to n dimensions may be different, but are made identical so that the same complementary gate drive signal G$_{Pk}$ can be used in each dimension. By using the same complementary gate drive signal G$_{Pk}$, it is possible to easily perform power expansion by multiple phases without a circuit related to control becoming large in scale. Also when the number of phases Pk is two or a divisor of another number of phases Pk, the complementary gate drive signal G$_{Pk(1\ to\ n)}$ of another dimension can be similarly used.

For example, in a case where the numbers of phases P1 to Pn of one to n dimensions are all set to three, as illustrated in FIG. 2(b), the number of complementary gate drive signals generated by the control circuit 20 is three, G$_1$, G$_2$, and G$_3$, and the number of phase selection signals generated by the selection signal generation circuit 30 is also three, X$_1$, X$_2$, and X$_3$.

Figure 3:
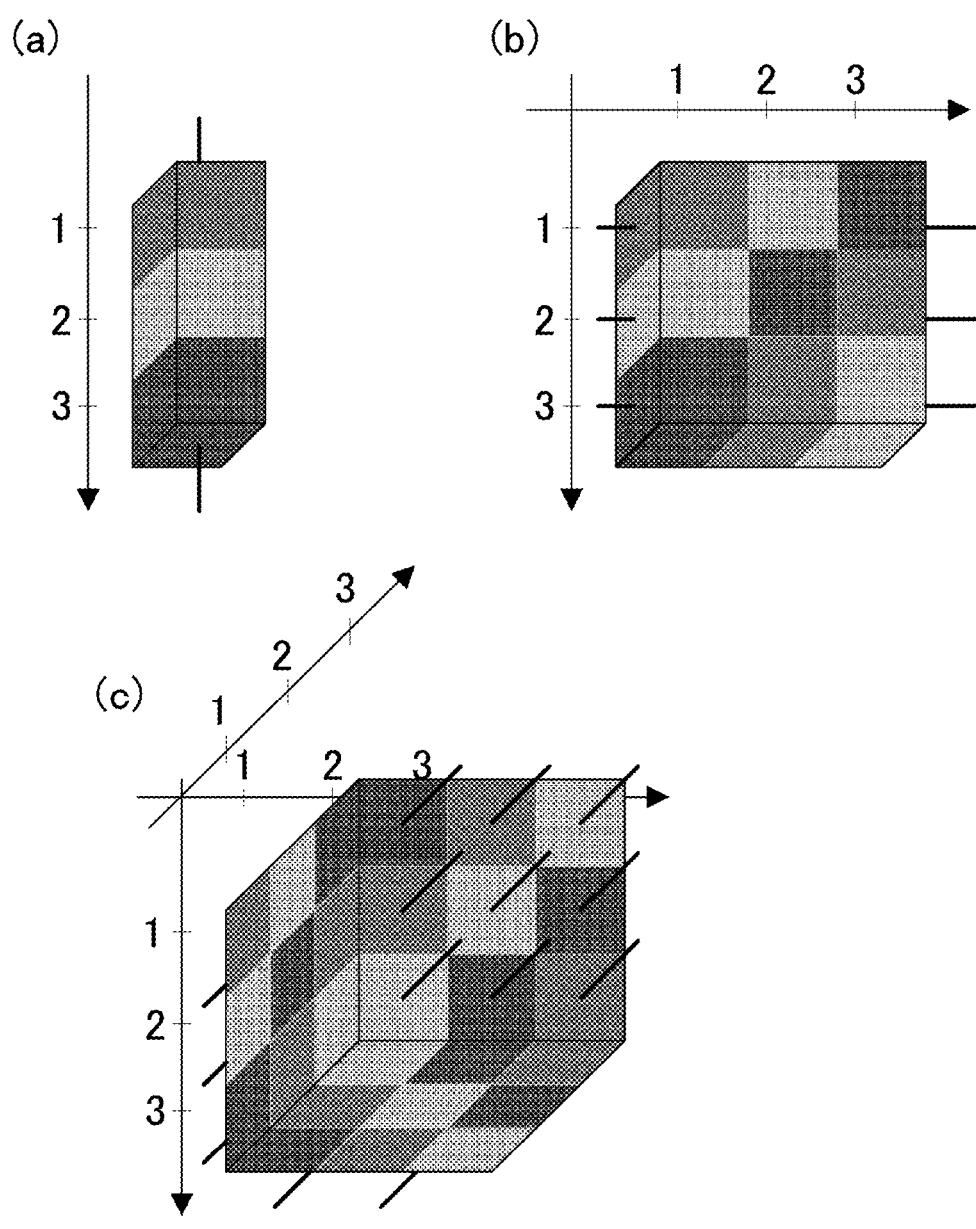
FIG. 3 is a diagram for explaining multidimensionalization (one to three dimensions) of the switching power supply device.

In a one-dimensional three-phase LLC converter including three of the circuit elements 10 including only the resonant capacitor Cr1, a phase is different by 360°/3 in each of the circuit elements 10. In FIG. 3(a), the circuit elements 10 are represented by three types of cubes having different concentrations, and a connection point that interconnects another end (the bypass terminal T1) of the resonant capacitor Cr1 is represented by one line penetrating three cubes.

For expansion in a two-dimensional direction, one of the resonant capacitor Cr1 of the circuit element 10 including two of the resonant capacitors Cr1 and Cr2 is connected in a one-dimensional direction, and another one of the resonant capacitor Cr2 is connected in a two-dimensional direction in a manner that phases do not overlap at a connection point. By the above, as illustrated in FIG. 3(b), three connection points are added in a two-dimensional direction, and nine of the circuit elements 10 including six interconnection points construct a two-dimensional three-plex LLC converter. FIG. 3(b) illustrates only a connection point in a two-dimensional direction.

Furthermore, for expansion in a three-dimensional direction, two of the resonant capacitors Cr1 and Cr2 of the circuit element 10 having three of the resonant capacitors Cr1, Cr2, and Cr3 are connected in a one-dimensional direction and a two-dimensional direction, respectively, and the third resonant capacitor Cr3 is interconnected in a three-dimensional direction in a manner that phases do not overlap at a connection point. By the above, as illustrated in FIG. 3(c), nine interconnection points are added in a three-dimensional direction, and twenty-seven circuit elements 10 including twenty-seven interconnection points construct a three-dimensional three-phase nine-plex LLC converter. FIG. 3(c) illustrates only a connection points in a three-dimensional direction.

As described above, the switching power supply device 1 is a multiphase LLC converter at a certain connection point, and when compared between connection points, multiphase LLC converters overlap to form a multi-plex LLC converter.

Therefore, the switching power supply device of the present embodiment can be referred to as a multiphase multi-plex LLC converter.

Figure 4:
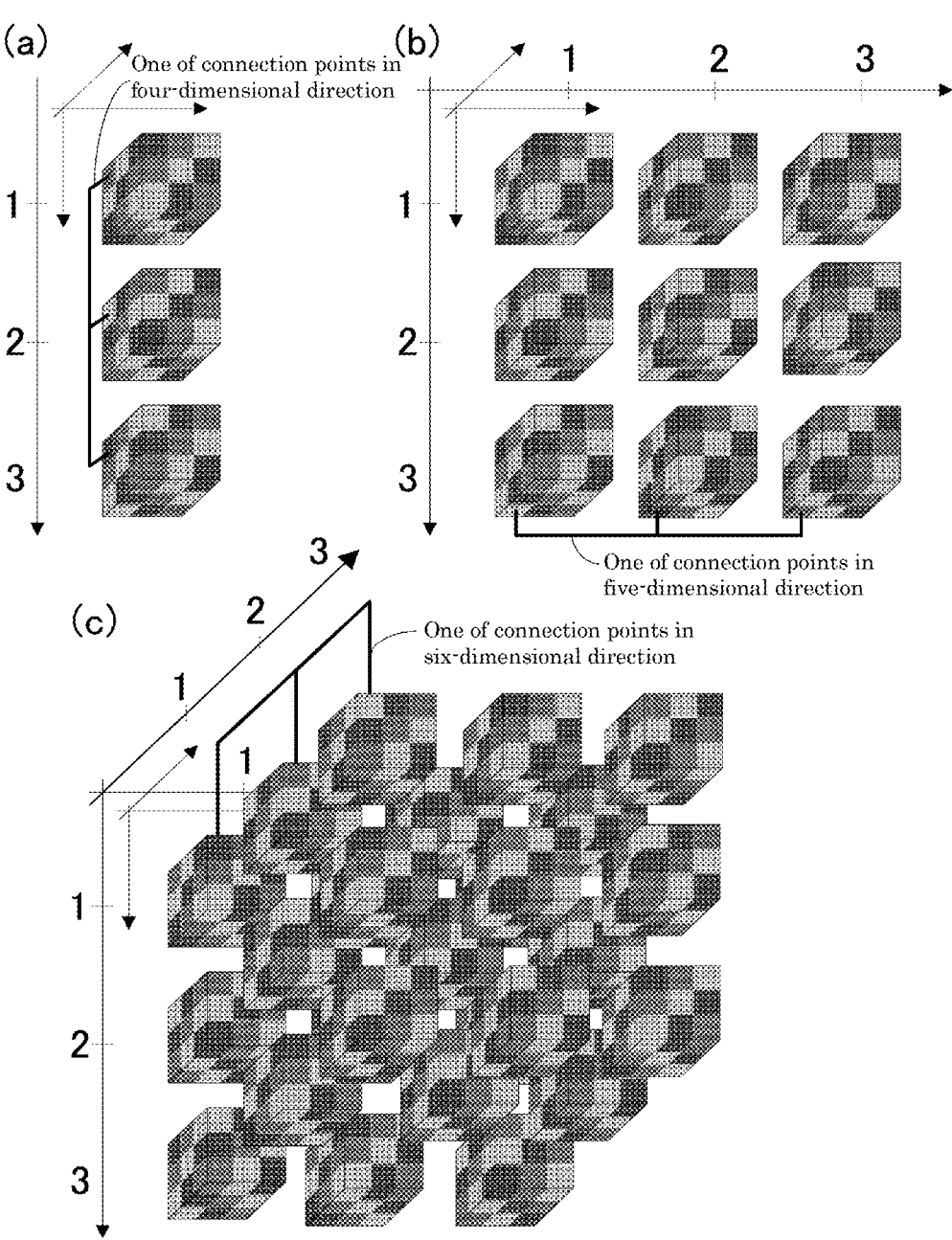
FIG. 4 is a diagram for explaining multidimensionalization (four to six dimensions) of the switching power supply device.

Furthermore, if the three-dimensional three-phase nine-plex LLC converter illustrated in FIG. 3(b) is expressed as one cube, as illustrated in FIG. 4(a), four dimensions can be recognized similarly as one dimension. For expansion in a four-dimensional direction, three of the resonant capacitors Cr1, Cr2, and Cr3 of the circuit element 10 including four of the resonant capacitors Cr1, Cr2, Cr3, and Cr4 are connected in three dimensions as described above, and the fourth resonant capacitor Cr4 is connected in a four-dimensional direction. By the above, a four-dimensional three-phase twenty-seven-plex LLC converter is constructed by eighty-one in total of the circuit elements 10 including three cubes by which a three-dimensional three-phase nine-plex LLC converter is constructed. As for connection points of four-dimensional three-phase twenty-seven-plex LLC converter, a cube of a three-dimensional three-phase nine-plex LLC converter already contains twenty-seven connection points, and since there are three cubes, there are eighty-one connection points, and twenty-seven connection points are added in a four-dimensional direction, so that one-hundred-eight connection points in total are included. FIG. 4(a) illustrates one of connection points in a four-dimensional direction.

When extended in a five-dimensional direction, as illustrated in FIG. 4(b), two-hundred-forty-three of the circuit elements 10 including four-hundred-five interconnection points construct a five-dimensional three-phase eighty-one-plex LLC converter. FIG. 4(b) illustrates one of connection points in a five-dimensional direction.

Furthermore, when extended in a six-dimensional direction, as illustrated in FIG. 4(c), seven-hundred-twenty-nine of the circuit elements 10 including one-thousand-four-hundred fifty-eight interconnection points construct a six-dimensional three-phase two-hundred-forty-three-plex LLC converter. FIG. 4(c) illustrates one of connection points in a six-dimensional direction.

Figure 5:
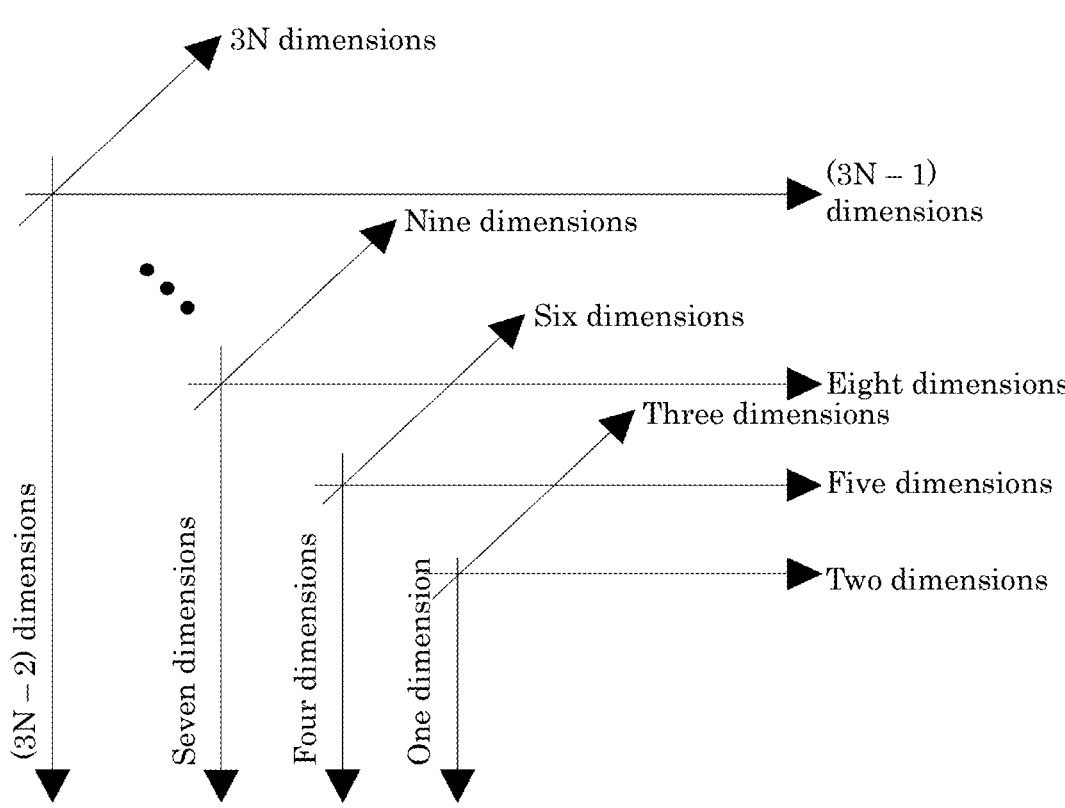
FIG. 5 is a diagram for explaining multidimensionalization of the switching power supply device.

Similarly, a six-dimensional three-phase two-hundred-forty-three-plex LLC converter extended to six dimensions is expressed by one cube, and as illustrated in FIG. 5, the number of circuits can be increased to seven dimensions, eight dimensions, and nine dimensions. Further increase in dimensionality is realized by adding a dimension axis to a multidimensional multi-plex LLC converter configured with 3N (N is a natural number) dimensions as one cube. Therefore, when a three-phase LLC converter is made n-dimensional, an n-dimensional three-phase $3^{n-1}$-plex LLC converter is obtained. In this way, it is possible to realize high power without increasing the number of complementary gate drive signals from three phases.

As described above, the switching power supply device 1 has a multidimensional fractal structure obtained by overlapping three-dimensional orthogonal axes. In a case of expansion to three or more dimensions, it is not necessary to set a phase difference to $360°/\Sigma$ unlike a conventional multiphase system according to the total number $\Sigma$ of the circuit elements 10. Since it is not necessary to prepare a complementary gate drive signal generation circuit that generates $\Sigma$ phase differences, a circuit related to control is prevented to become large in scale. In particular, in a case where the numbers of phases Pk in the dimension are identical, by construction of a multiphase LLC converter having a phase difference of $360°/Pk$ with respect to a certain connection point, it is possible to increase the number of circuits and increase power while performing current balance by using a circuit that generates Pk complementary gate drive signals.

The switching power supply device 1 according to the present embodiment can be constructed as an integrated circuit (for example, as a power supply IC or a system-on-chip (SoC)) in which a semiconductor and a magnetic component are mixed in a package having limited size. As a simplified example, the switching power supply device 1 having output power of 1 kW (kilowatt) can be realized by connecting ten of the circuit elements 10 that output power of 100 W. A multi-phase multi-plex converter configured by an integrated circuit may be applied to a Micro Electro Mechanical System (MEMS).

The circuit element 10 of the switching power supply device 1 includes the resonant capacitors Cr1 to Crn divided into n pieces in addition to the resonant capacitor Cr0 having another end connected to the low potential input terminal Tin⁻. Another end (bypass terminal Tk) of the k-th (1 to n) resonant capacitor Crk is connected to another end (bypass terminal Tk) of the k-th resonant capacitor Crk of another one of the circuit elements 10 so that a multiphase LLC converter having a phase difference of $360°/Pk$ is constructed by Pk of the circuit elements 10. In this case, the total number $\Sigma$ of the circuit elements 10 included in the switching power supply device 1 is expressed by Formula (1) above, and a total number $\Sigma c$ of interconnection points by the resonant capacitors Cr1 to Crn is expressed by Formula (2) below.

[Mathematical formula 2]

$$\sum c = \prod_{k=1}^{n} Pk \cdot \sum_{k=1}^{n} Pk^{-1} \tag{2}$$

A resonance frequency ωr when all $\Sigma$ of the circuit elements 10 of the switching power supply device 1 operate is expressed by Formula (3) below.

[Mathematical formula 3]

$$\omega r = \frac{1}{\sqrt{Lr \sum_{k=0}^{n} Cr_k}} \tag{3}$$

The resonance frequency ωr in a case where capacities of the resonant capacitors Cr0 to Crn are equal is expressed by Formula (4) below.

[Mathematical formula 4]

$$\omega r = \frac{1}{\sqrt{Lr \sum_{k=0}^{n} Cr_k}} = \frac{1}{\sqrt{Lr \frac{Cr}{n+1} \cdot (n+1)}} = \frac{1}{\sqrt{LrCr}} \tag{4}$$

That the total number $\Sigma$ of the circuit elements 10 and interconnection points coincide with each other is a condition expressed by Formula (5) below from Formulas (1) and (2).

[Mathematical formula 5]

$$\sum_{k=1}^{n} Pk^{-1} \leqq 1 \tag{5}$$

In particular, when the circuit element 10 is modularized as illustrated in FIG. 1, the total number Σ of the circuit elements 10 and connection points can be limited to 1:1.

Presence of the resonant capacitor Cr0 enables the circuit element 10 to perform single-phase operation at the time of light loading (at the time of small output power). However, in a case where single-phase operation is not required, the resonant capacitor Cr0 may be omitted. By omitting the resonant capacitor Cr0, current balance between LLC converters can be easily achieved even if ground potentials of the LLC converters installed separately are different.

In a case where the resonant capacitor Cr0 is omitted, the resonance frequency ωr when all Σ of the circuit elements 10 of the switching power supply device 1 operate is expressed by Formula (6) below.

[Mathematical formula 6]

$$\omega r = \frac{1}{\sqrt{Lr \sum_{k=1}^{n} Cr_k}} \tag{6}$$

Further, the resonance frequency ωr in a case where capacities of the resonant capacitors Cr1 to Crn are equal is expressed by Formula (7) below.

[Mathematical formula 7]

$$\omega r = \frac{1}{\sqrt{Lr \sum_{k=1}^{n} Cr_k}} = \frac{1}{\sqrt{Lr \frac{Cr}{n} \cdot n}} = \frac{1}{\sqrt{LrCr}} \tag{7}$$

Figure 6:
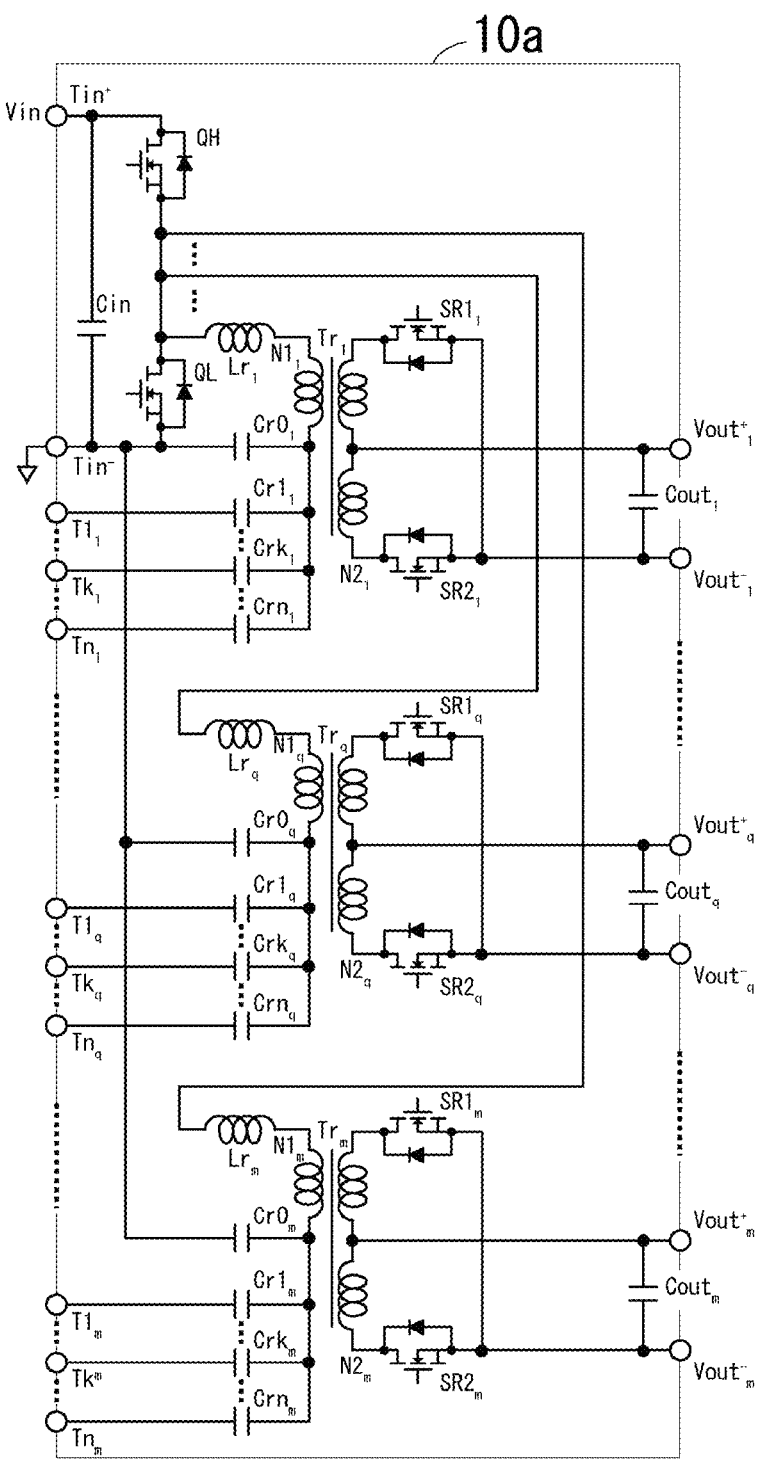
FIG. 6 is a diagram illustrating another configuration example of a circuit element.

FIG. 6 illustrates a circuit element 10a obtained by parallel arrangement and modularization of m configurations other than first switch element QH and second switch element QL. In FIG. 6, only a main circuit of the circuit element 10a is illustrated in a solid line frame (corresponding to a module).

The circuit element 10a includes resonant reactors $Lr_1$ to $Lr_m$ having one end connected to a connection point between the first switch element QH and the second switch element QL. Here, m is a natural number of two or more.

The circuit element 10a includes m resonant circuits including a resonant reactor $Lr_q$ (q is a natural number of one to m), a primary winding $N1_q$ of a transformer $Tr_q$, and n+1 resonant capacitors $Cr0_q$ to $Crn_q$.

The circuit element 10a includes m rectifier smoothing circuits including synchronous rectifying elements $SR1_q$ and $SR2_q$ that rectify and smooth voltage of a secondary winding $N2_q$ of the transformer $Tr_q$ and an output capacitor $Cout_q$. For the rectifier smoothing circuit, a rectifying system such as center tap rectification, bridge rectification, voltage doubler rectification, and Cockcroft-Walton rectification can be employed.

The resonant capacitor $Cr0_q$ has one end connected in series to the resonant reactor $Lr_q$ and the primary winding $N1_q$ of the transformer $Tr_q$, and another end connected to the low potential input terminal Tin⁻.

The resonant capacitors $Cr1_q$ to $Crn_q$ have one ends which are all connected in series to the resonant reactor $Lr_q$ and the primary winding $N1_q$ of the transformer $Tr_q$, and another ends respectively connected to bypass terminals $T1_q$ to $Tn_q$. Another end (bypass terminal $Tk_q$) of a k-th (k is a natural number of one to n) resonant capacitor $Crk_q$ is connected to another end (bypass terminal $Tk_q$) of the k-th resonant capacitor $Crk_q$ of another one of the circuit elements 10 so that a k-dimensional multiphase LLC converter having a phase difference of 360°/Pk is constructed by Pk (Pk is any natural number) of the circuit elements 10a.

Figure 7:
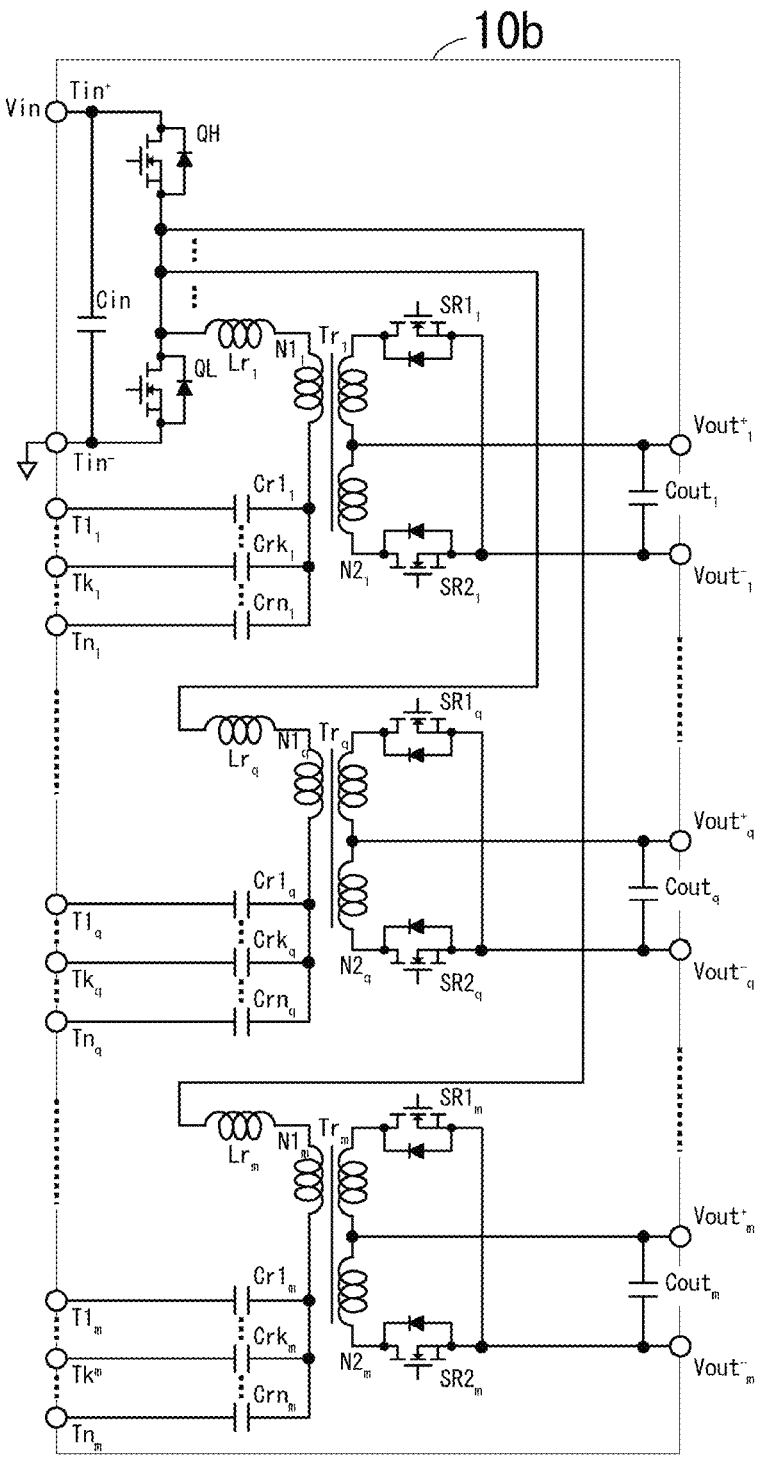
FIG. 7 is a diagram illustrating another configuration example of the circuit element.

In a case where single-phase operation is not required, the resonant capacitors $Cr0_1$ to $Cr0_m$ of the circuit element 10a may be omitted. FIG. 7 illustrates a circuit element 10b in which the resonant capacitors $Cr0_1$ to $Cr0_m$ are omitted from the circuit element 10a.

Power of the circuit elements 10a and 10b is expanded by m resonant circuits. Here, when the resonant reactors $Lr_1$ to $Lr_m$ have an identical capacity Lr and flowing current is i, a magnetic flux Φ of the resonant reactor $Lr_q$ is expressed by Formula (8) below.

[Mathematical formula 8]

$$\Phi = Lr \cdot i \tag{8}$$

Figure 8:
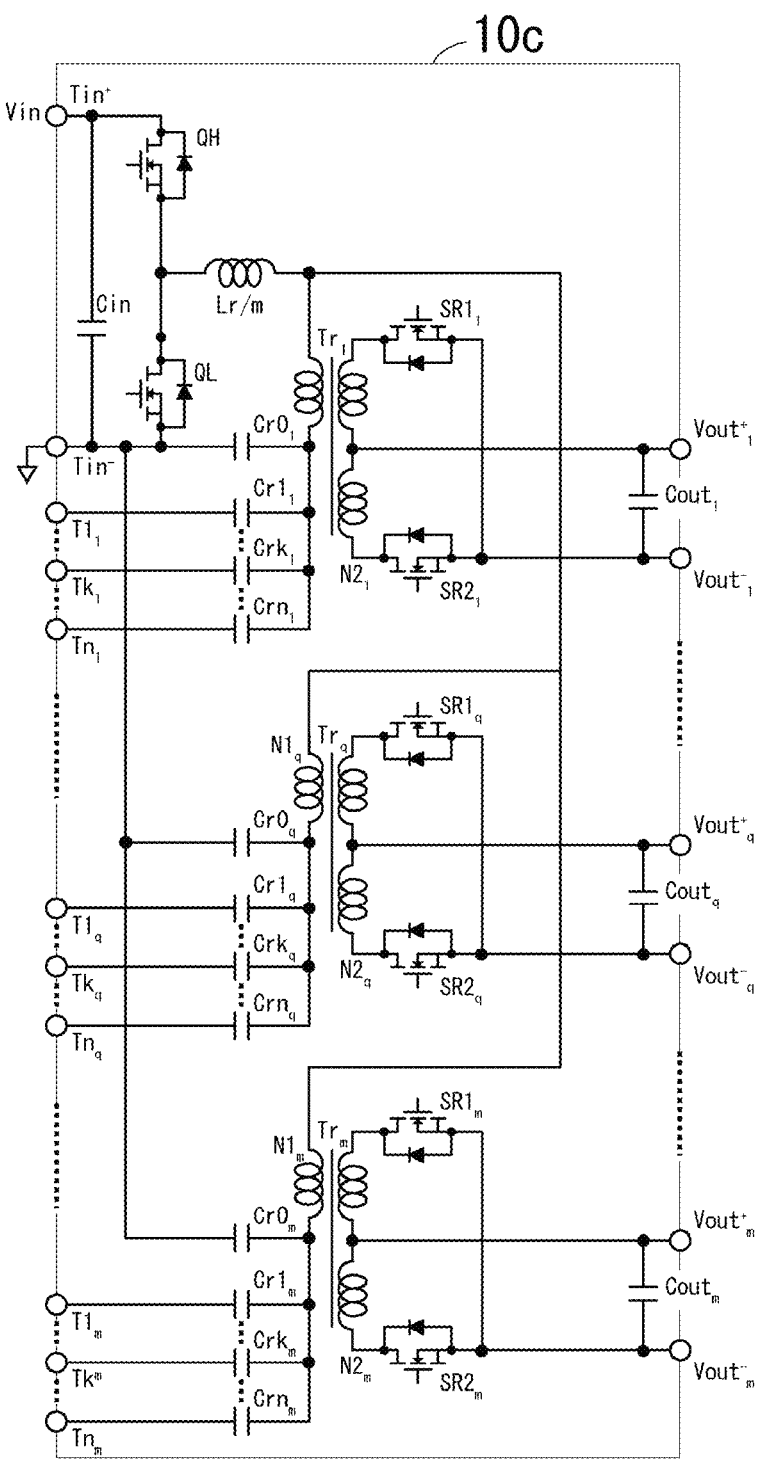
FIG. 8 is a diagram illustrating another configuration example of the circuit element.
Figure 9:
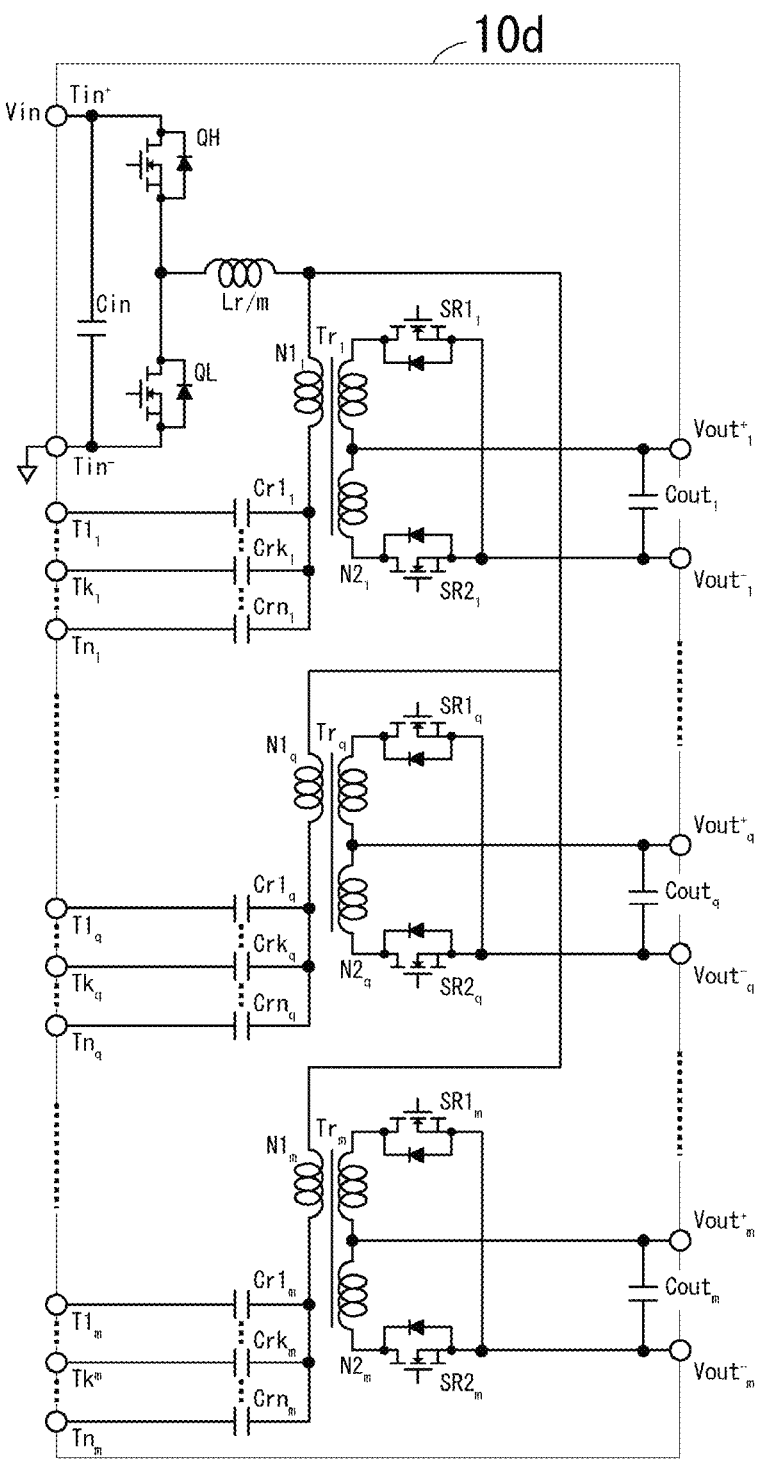
FIG. 9 is a diagram illustrating another configuration example of the circuit element.

FIGS. 8 and 9 illustrate a circuit element 10c and a circuit element 10d in which the resonant reactors $Lr_1$ to $Lr_m$ are combined into one resonant reactor represented by a reference sign "Lr/m". When the resonant reactors $Lr_1$ to $Lr_m$ have the identical capacity Lr, capacity of the resonant reactor "Lr/m" is 1/m of Lr described above. In the circuit element 10c, the resonant reactors $Lr_1$ to $Lr_m$ of the circuit element 10a illustrated in FIG. 6 are combined into one resonant reactor "Lr/m". In the circuit element 10d, the resonant reactors $Lr_1$ to $Lr_m$ of the circuit element 10b illustrated in FIG. 7 are combined into one resonant reactor "Lr/m".

Current flowing through the resonant reactor "Lr/m" is the sum of current i flowing through the resonant reactors $Lr_1$ to $Lr_m$, and is mi. Therefore, the magnetic flux Φ of a resonant reactor of the resonant reactor "Lr/m" is expressed by Formula (9) below and is the same as the magnetic flux Φ obtained by Formula (8).

[Mathematical formula 9]

$$\frac{Lr}{m} \cdot mi = Lr \cdot i = \Phi \tag{9}$$

That is, resonant reactors in units of the circuit element 10c and the circuit element 10d are the same as the resonant reactor Lr of the circuit element 10. Therefore, in the switching power supply device 1 including the circuit element 10c, the resonance frequency or when all Σ of the circuit elements 10c operate is the same as that in Formulas (3) and (4) above. In the switching power supply device 1 including the circuit element 10d, the resonance frequency or when all Σ of the circuit elements 10d operate is the same as that in Formulas (6) and (7) above.

As described above, m of the resonant reactors $Lr_1$ to $Lr_m$ of the circuit elements 10a and 10b can be integrated into one resonant reactor "Lr/m" like the circuit elements 10c and 10*d* regardless of the presence or absence of the resonant capacitors $Cr0_1$ to $Cr0_m$. Capacity of the resonant reactor "Lr/m" of the circuit elements 10*c* and 10*d* may be 1/m of capacity of the resonant reactor Lr of the circuit element 10. Therefore, in the switching power supply device 1 including the circuit elements 10*c* and 10*d*, total size of a resonant reactor can be set to 1/m and total weight can also be set to 1/m with respect to the switching power supply device 1 having an identical dimension including the circuit element 10. That is, in power expansion, in the switching power supply device 1, the resonant reactor Lr can be made smaller as further parallel arrangement is achieved, and the resonant capacitor Cr can be made smaller as the configuration is more multidimensional. In a case where power is regulated, in the switching power supply device 1, as further parallel arrangement is achieved, the transformers $Tr_1$ to $T_m$ can be made smaller, and the switching power supply device 1 can be made more suitable for integration, and can have smaller component size.

Figure 10:
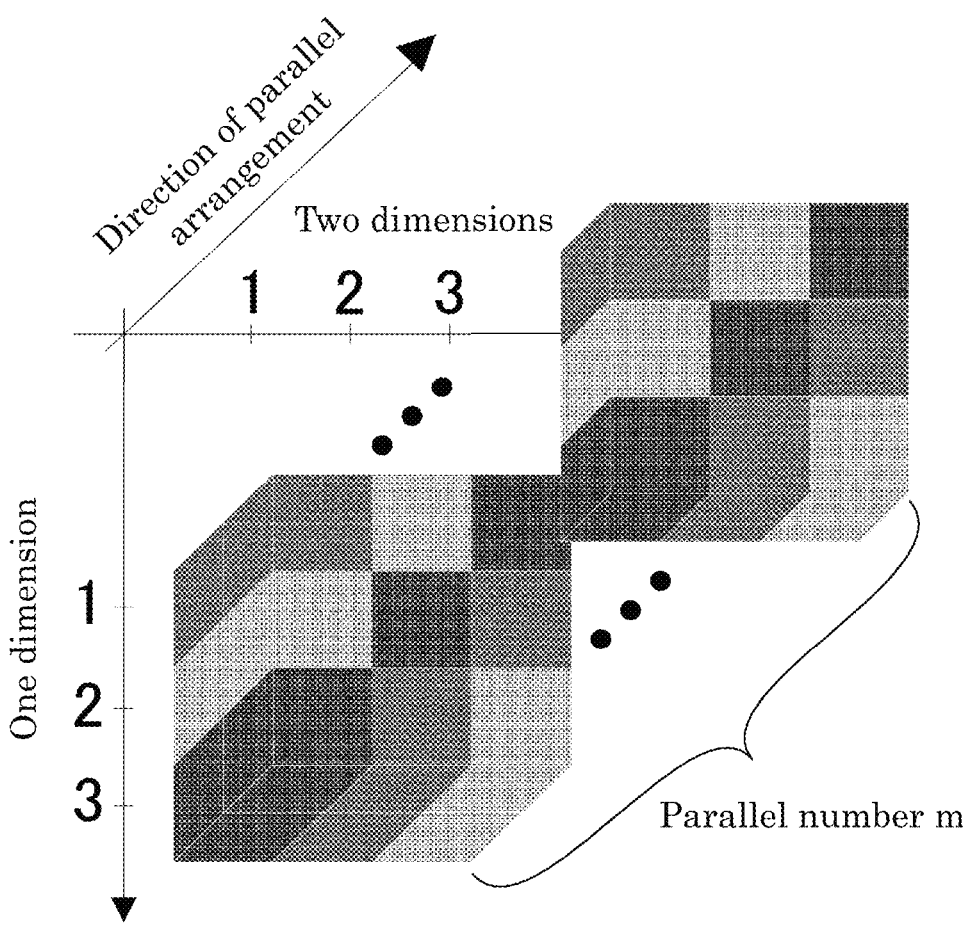
FIG. 10 is a diagram for explaining parallel arrangement and multidimensionalization of the switching power supply device.

FIG. 10 illustrates a two-dimensional three-phase three-plex LLC converter in which each resonant circuit of the circuit elements 10*a* to 10*d* is represented by a cube, cubes in different phases are represented by three different concentrations, and the number of them in parallel arrangement is m. Referring to FIG. 10, it can be seen that parallel arrangement of resonant circuits in the circuit elements 10*a* to 10*d* is synonymous with increasing the number of dimensions by one.

As described above, the present embodiment includes a plurality (Σ) of half-bridge LLC converters in which resonant circuits are arranged in parallel as the circuit elements 10*a* and 10*b*. The circuit elements 10*a* and 10*b* include the first switch element QH and the second switch element QL connected in series between a positive electrode and a negative electrode of the DC power supply Vin, and m (m is a natural number of two or more) resonant circuits arranged in parallel, each of which includes the resonance reactor Lr having one end connected to a connection point between the first switch element QH and the second switch element QL, a primary winding N1 of the transformer Tr, and n (n is a natural number of two or more) of a first order resonant capacitor (the resonant capacitor Cr1) to an n-th resonant capacitor (the resonant capacitor Crn). The resonant capacitor $Crk_q$ (k is a natural number of one to n) of a q-th (q is a natural number of one to m) resonant circuit arranged in parallel has one end connected in series to the resonance reactor $Lr_q$ and the primary winding $N1_q$ of the transformer $Tr_q$. The resonant capacitor $Crk_q$ of the q-th resonant circuit arranged in parallel has another end connected to the resonant capacitor $Crk_q$ of the q-th resonant circuit arranged in parallel in another one of the circuit elements 10*a* and 10*b* so that a k-dimensional multiphase LLC converter having a phase difference of 360°/Pk is constructed by Pk (Pk is any natural number) circuit elements.

With this configuration, in the present embodiment, the number of complementary gate drive signals can be made smaller than the total number Σ of the circuit elements 10*a* and 10*b*, and the number of complementary gate drive signals is not increased. In the present embodiment, by parallel arrangement of resonant circuits, it is possible to realize high power of the circuit elements 10*a* and 10*b*. In the present embodiment, the total number Σ of the circuit elements 10 can be increased, and high power can be increased by balancing current between the circuit elements 10.

Further, the circuit elements 10*c* and 10*d* of the present embodiment include a plurality (Σ) of half-bridge LLC converters in which resonant circuits (circuit portions excluding the resonance reactor "Lr/m") are arranged in parallel as the circuit elements 10*a* and 10*b*. The circuit elements 10*c* and 10*d* include the first switch element QH and the second switch element QL connected in series between a positive electrode and a negative electrode of the DC power supply Vin, the resonant reactor "Lr/m" having one end connected to a connection point between the first switch element QH and the second switch element QL, and m (m is a natural number of two or more) resonant circuits arranged in parallel, each of which includes the primary winding N1 of the transformer Tr connected to another end of the resonant reactor "Lr/m" and n (n is a natural number of two or more) of a first resonant capacitor (the resonant capacitor Cr1) to an n-th resonant capacitor (the resonant capacitor Crn). The resonant capacitor $Crk_q$ (k is a natural number of one to n) of a q-th (q is a natural number of one to m) resonant circuit arranged in parallel has one end connected in series to the resonance reactor $Lr_q$ and the primary winding $N1_q$ of the transformer $Tr_q$. The resonant capacitor $Crk_q$ of the q-th resonant circuit arranged in parallel has another end connected to the resonant capacitor $Crk_q$ of the q-th resonant circuit arranged in parallel in another one of the circuit elements 10*a* and 10*b* so that a k-dimensional multiphase LLC converter having a phase difference of 360°/Pk is constructed by Pk (Pk is any natural number) circuit elements.

With this configuration, in the switching power supply device 1 including the circuit elements 10*c* and 10*d*, total size of a resonant reactor can be set to 1/m and total weight can also be set to 1/m with respect to the switching power supply device 1 having the identical dimension including the circuit element 10. That is, in power expansion, in the switching power supply device 1, the resonant reactor Lr can be made smaller as further parallel arrangement is achieved, and the resonant capacitor Cr can be made smaller as the configuration is more multidimensional.

Furthermore, according to the present embodiment, the total number Σ of the circuit elements 10*a* to 10*d* is a product of the number of phases included in each dimension (Σ=P1× P2×, . . . , ×Pn).

With this configuration, the number of dimensions can be increased and the total number Σ of the circuit elements 10*a* to 10*d* can be exponentially increased, and it is possible to cope with high power.

Although the present invention is described above with reference to the specific embodiment, it is needless to say that the above-described embodiment is an example and can be modified and implemented without departing from the spirit of the present invention.

In the above embodiment, the resonant reactor Lr is physically provided in each of the circuit elements 10. Alternatively, the resonant reactor Lr may use leakage inductance of a transformer.

The invention claimed is:

1. A switching power supply device comprising:

a plurality of half-bridge LLC converters each configured as a circuit element, each of the plurality of half-bridge LLC converter including:

a first switch element and a second switch element connected in series to both ends of a DC power supply; and m resonant circuits arranged in parallel, each including a respective resonant reactor having one end connected to a connection point between the first switch element and the second switch element, a respective primary winding of a respective transformer, and n respective resonant capacitors comprising a first order resonant capacitor to an $n^{th}$ order resonant capacitor, wherein m is a natural number equal to or greater than two, and n is a natural number equal to or greater than two, wherein a respective $k^{th}$ order resonant capacitor of a respective $q^{th}$ one of the m resonant circuits arranged in parallel has one end connected in series to the respective resonant reactor and the respective primary winding of the respective transformer, and another end connected to another $k^{th}$ order resonant capacitor of another $q^{th}$ one of the m resonant circuits arranged in parallel in another circuit element so that a k-dimensional multiphase LLC converter having a phase difference of 360°/Pk is constructed by Pk circuit elements, wherein k is a natural number between one and n, q is any natural number between one and m, and Pk is a natural number equal to or greater than one.

2. The switching power supply device according to claim 1, wherein a total number of the circuit elements is a product of numbers of phases included in dimensions.

3. The switching power supply device according to claim 2, wherein a total number of the m resonant circuits is a product of the product of numbers of phases included in the dimensions and a parallel number m.

4. A switching power supply device comprising:
a plurality of half-bridge LLC converters each configured as a circuit element, each of the plurality of half-bridge LLC converters including:
a first switch element and a second switch element connected in series to both ends of a DC power supply;
a resonant reactor having one end connected to a connection point between the first switch element and the second switch element; and
m resonant circuits arranged in parallel, each including a respective primary winding of a respective transformer, and n respective resonant capacitors comprising a first order resonant capacitor to an $n^{th}$ order resonant capacitor, connected to another end of the resonant reactor, wherein m is a natural number equal to or greater than two, and n is a natural number equal to or greater than two,
wherein a respective $k^{th}$ order resonant capacitor of a respective $q^{th}$ one of the m resonant circuits arranged in parallel has one end connected in series to the resonant reactor and the respective primary winding of the respective transformer, and another end connected to another $k^{th}$ order resonant capacitor of another $q^{th}$ one of the m resonant circuits arranged in parallel in another circuit element so that a k-dimensional multiphase LLC converter having a phase difference of 360°/Pk is constructed by Pk circuit elements, wherein k is a natural number between one and n, q is any natural number between one and m, and Pk is a natural number equal to or greater than one.

5. The switching power supply device according to claim 4, wherein a total number of the circuit elements is a product of numbers of phases included in the dimensions.

6. The switching power supply device according to claim 5, wherein a total number of the m resonant circuits is a product of the product of numbers of phases included in the dimensions and a parallel number m.

7. A switching power supply device comprising:
a plurality of half-bridge LLC converters each configured as a circuit element, each of the plurality of half-bridge LLC converter including:

a first switch element and a second switch element connected in series to both ends of a DC power supply; and
m resonant circuits arranged in parallel, each including a respective resonant reactor having one end connected to a connection point between the first switch element and the second switch element, a respective primary winding of a respective transformer, and n respective resonant capacitors comprising a zero order resonant capacitor to an $n^{th}$ order resonant capacitor, wherein m is a natural number equal to or greater than two, n is a natural number equal to or greater than two, and each of the zero order resonant capacitors is connected to a low potential input terminal of the DC power supply,
wherein a respective $k^{th}$ order resonant capacitor of a respective $q^{th}$ one of the m resonant circuits arranged in parallel has one end connected in series to the respective resonant reactor and the respective primary winding of the respective transformer, and another end connected to another $k^{th}$ order resonant capacitor of another $q^{th}$ one of the m resonant circuits arranged in parallel in another circuit element so that a k-dimensional multiphase LLC converter having a phase difference of 360°/Pk is constructed by Pk circuit elements, wherein k is a natural number between one and n, q is any natural number between one and m, and Pk is a natural number equal to or greater than one.

8. The switching power supply device according to claim 7, wherein a total number of the circuit elements is a product of numbers of phases included in dimensions.

9. The switching power supply device according to claim 8, wherein a total number of the m resonant circuits is a product of the product of numbers of phases included in the dimensions and a parallel number m.

10. A switching power supply device comprising:
a plurality of half-bridge LLC converters each configured as a circuit element, each of the plurality of half-bridge LLC converters including:
a first switch element and a second switch element connected in series to both ends of a DC power supply;
a resonant reactor having one end connected to a connection point between the first switch element and the second switch element; and
m resonant circuits arranged in parallel, each including a respective primary winding of a respective transformer, and n respective resonant capacitors comprising a zero order resonant capacitor to an $n^{th}$ order resonant capacitor, connected to another end of the resonant reactor, wherein m is a natural number equal to or greater than two, n is a natural number equal to or greater than two, and each of the zero order resonant capacitor is connected to a low potential input terminal of the DC power supply,
wherein a respective $k^{th}$ order resonant capacitor of a respective $q^{th}$ one of the m resonant circuits arranged in parallel has one end connected in series to the resonant reactor and the respective primary winding of the respective transformer, and another end connected to another $k^{th}$ order resonant capacitor of another $q^{th}$ one of the m resonant circuits arranged in parallel in another circuit element so that a k-dimensional multiphase LLC converter having a phase difference of 360°/Pk is constructed by Pk circuit elements, wherein k is a natural number between one and n, q is any natural number between one and m, and Pk is a natural number equal to or greater than one.

11. The switching power supply device according to claim 10, wherein a total number of the circuit elements is a product of numbers of phases included in dimensions.

12. The switching power supply device according to claim 11, wherein a total number of the m resonant circuits is a product of the product of numbers of phases included in the dimensions and a parallel number m.

\* \* \* \* \*